United States Patent [19]
Maekawa et al.

[11] Patent Number: 5,765,774
[45] Date of Patent: Jun. 16, 1998

[54] SEAT BELT RETRACTOR EMPLOYING ULTRASONIC MOTOR

[75] Inventors: Tetsuya Maekawa, Hikone; Yuichi Sawatari, Ika-gun, both of Japan

[73] Assignee: Takata Corporation, Tokyo, Japan

[21] Appl. No.: 628,256

[22] Filed: Apr. 5, 1996

[51] Int. Cl.[6] .......................... B60R 22/10; B60R 22/40; B60R 22/34
[52] U.S. Cl. ...................... 242/390.9; 180/268; 280/806; 280/807; 297/478; 242/382.6
[58] Field of Search ................... 242/390.8, 390.9, 242/382.6; 180/268, 271, 281, 282, 286; 280/806, 807; 297/474, 475, 476, 477, 478

[56] References Cited

U.S. PATENT DOCUMENTS

| | | | |
|---|---|---|---|
| 4,489,804 | 12/1984 | Kamijo | 180/268 |
| 4,506,844 | 3/1985 | Ernst . | |
| 4,562,374 | 12/1985 | Sashida | 310/328 |
| 4,666,097 | 5/1987 | Tsuge et al. | 242/390.9 |
| 4,667,894 | 5/1987 | Izuchi et al. | 242/382.6 |
| 4,787,569 | 11/1988 | Kanada et al. | 242/390.9 |
| 4,811,912 | 3/1989 | Takada . | |
| 4,959,579 | 9/1990 | Kuwabara et al. | 310/323 |
| 4,966,394 | 10/1990 | Thomas et al. | 280/807 |
| 5,005,777 | 4/1991 | Fernandez | 242/390.8 |
| 5,141,249 | 8/1992 | Saitoh et al. | 280/804 |
| 5,181,715 | 1/1993 | Ohkoda et al. | 271/272 |
| 5,181,739 | 1/1993 | Bauer et al. | 280/807 |
| 5,363,006 | 11/1994 | Yano et al. | 310/323 |
| 5,454,591 | 10/1995 | Mazur et al. | 280/735 |
| 5,552,986 | 9/1996 | Omura et al. | 280/807 |
| 5,558,370 | 9/1996 | Behr | 242/390.8 |

FOREIGN PATENT DOCUMENTS

| | | |
|---|---|---|
| 43 04 498 | 8/1993 | Germany . |
| 50-102017 | 8/1975 | Japan . |
| 58-101855 | 6/1983 | Japan . |
| 58-101857 | 6/1983 | Japan . |
| 58-139845 | 8/1983 | Japan . |
| 1393505 | 5/1975 | United Kingdom . |

Primary Examiner—John M. Jillions
Attorney, Agent, or Firm—Foley & Lardner

[57] ABSTRACT

A reel of a seat belt retractor equipped in a automobile for reeling a seat belt is integral with a shaft of an ultrasonic motor. The ultrasonic motor is rotated either one direction or the other so as to retract or draw out the seat belt. A control device for controlling the rotation of the ultrasonic motor by supplying a control signal based on the signals sensed by a buckle sensor which senses a buckle is locked, a tension sensor which senses tension of a seat belt, a speed sensor which senses speed of the automobile, a rotation sensor which senses the rotation degree and a child seat sensor which senses whether child seat is set on a passenger seat.

20 Claims, 6 Drawing Sheets

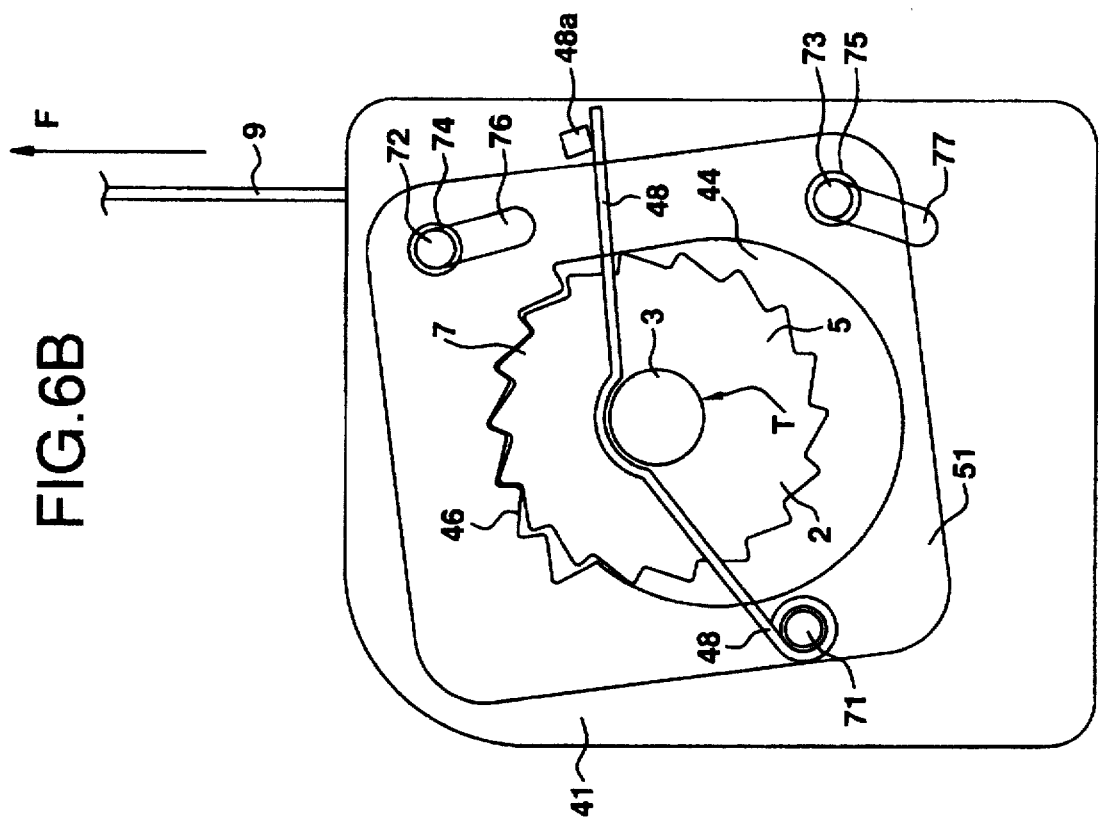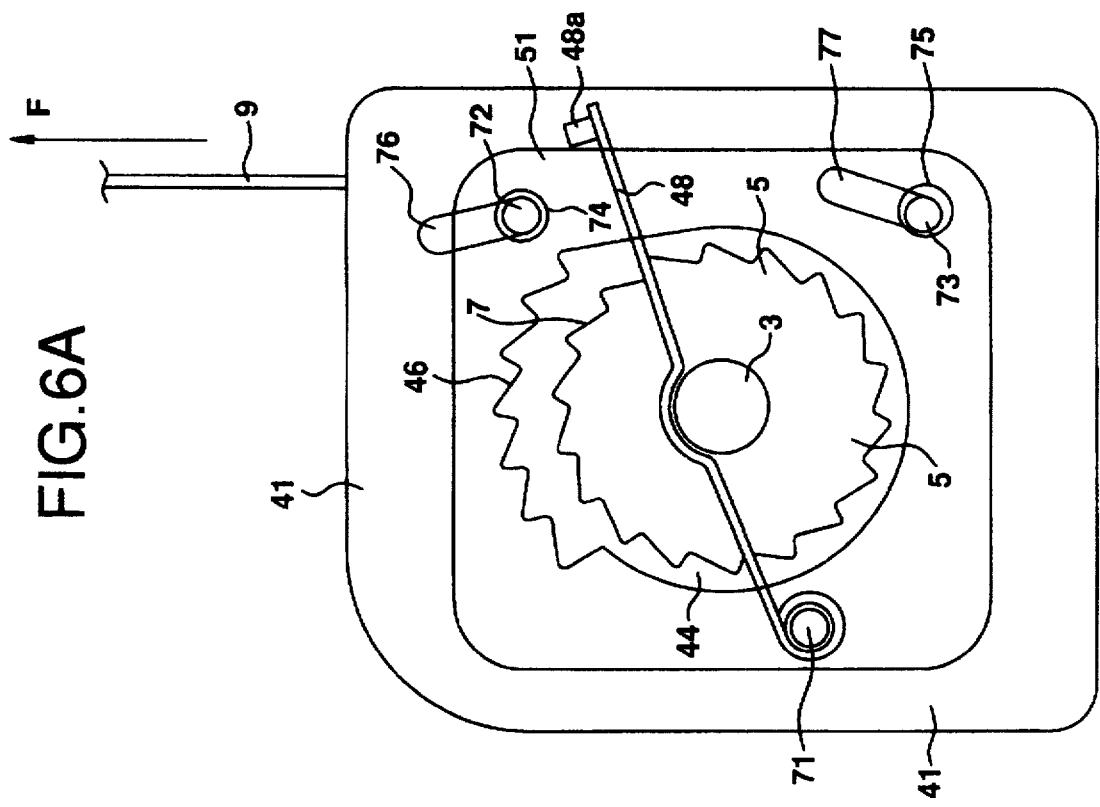

SEAT BELT RETRACTOR EMPLOYING ULTRASONIC MOTOR

BACKGROUND OF THE INVENTION

2. FIELD OF THE INVENTION

This invention relates to a seat belt retractor, particularly to a seat belt retractor using an ultrasonic motor.

2. Description of Prior Art

Traditionally, seat belt retractors employing motors reeled belts by reducing the motors' rotation speed with gears. For example, Japanese Laid-Open Utility Model No. 50-102017/1975 and British Patent No. 1393505 disclose retractors wherein a seat belt reel shaft and motor rotation shaft are connected via a planetary gear. Japanese Laid-Open Patent No. 58-101855/1983 and Japanese Laid-Open Patent No. 58-101857/1983 disclose retractors wherein a seat belt reel shaft and motor rotation shaft are connected via a worm gear. These retractors with motors, as disclosed in U.S. Pat. No. 4,489,804, can detect the seat belt position to determine the optimum belt position for passengers and adjust tension according to the automobile's speed. As disclosed in the Japanese Laid-Open Patent No. 58-101855/1983, such seat belt retractors can draw out the seat belt according to a passenger's posture and adjust the amount of slack. Also, at high speeds and in emergencies, it can increase the tension as disclosed in Japanese Examined Patent No. 58-139845/1983, or add a function to lock the seat belt by using a pendulum as disclosed in Japanese Laid-Open Patent No. 58-101855/1983 and Japanese Laid-Open Patent No. 58-101857/1983.

The aforementioned seat belt retractors wherein a seat belt reel shaft and motor rotation shaft are connected via a planetary gear can be made smaller than those with a worm gear, but their reeling power is weak. They may function sufficiently when drawing out the belt, allowing slack or reeling the belt when the belt is not used, but they cannot reel the belt sufficiently in case of an emergency or while operated at high speeds because the tension force is too weak. On the other hand, retractors in which a DC motor drives a belt reel shaft via a worm gear have a relatively large reeling power in emergency situations, but they are a disadvantage. Some methods employ the force of explosives to increase the reeling speed in emergency situations, but such devices are inevitably larger and more complex.

Those seat belt retractors wherein the motor rotation shaft and the reel shaft are connected via a worm gear, as stated above, have greater reeling force, but require a clutch to freely draw out the belt when a passenger fastens the belt or shifts body position forward after fastening the belt. Even with the planetary gear, it is more convenient to use a clutch for freely drawing out or retracting the belt for smooth fastening or under changing posture conditions. When a clutch is used, the belt needs a tension force applied to it when the clutch is disengaged; a power spring must be attached to the belt reel shaft to always force the belt towards the reeling direction. Therefore, retractors with DC motors combined with numerous functions tend to have complex, large mechanisms. Also, noise is a common problem for retractors with planetary or worm gears.

A mechanism to detect emergencies by using a pendulum is disclosed in Japanese Laid-Open Patent No. 58-101855/1983. According to this detection mechanism, when a G force is applied to the automobile body a pendulum is tripped causing the belt to lock. For non-locking operation, the pendulum needs to be maintained horizontally. When such a seat belt retractor is installed on a reclining seat, the incline of the seat causes the pendulum to be tripped; this is inconvenient when, for example, the retractor is locked to prevent the belt from being drawn out.

Retractor mechanisms suited for emergencies are disclosed, for example, in U.S. Pat. No. 4,506,844 and U.S. Pat. No. 4,811,912 (Japanese Laid-Open Utility Model No. 63-145747/1988). These mechanisms include ratchet teeth on the periphery of the guards on both sides of the seat belt reel, and teeth are also provided on a frame supporting the reel in order to engage with the ratchet teeth; some mechanisms lock the seat belt by letting these teeth engage in emergencies (they are normally unengaged). When such mechanisms are combined with DC motors, however, they become inevitably more complex and heavier. Emergency locking can be accomplished by combining a DC motor and a worm gear, but, as stated above, such an attempt would make the mechanism inherently complex and heavy.

A seat belt needs to lock when holding a child seat, but must allow a passenger to move freely. In order to deal with such a contradicting demand, as disclosed in Japanese Laid-Open Utility Model No. 63-145747/1988 and U.S. Pat. No. 4,811,912, some mechanisms are structured so that a retractor is switched to an automatic mode once the belt is drawn out completely; the belt can only be reeled and it is locked otherwise thereafter. This locking mechanism is comprised of a combination of a retractor reel and a gear; the mechanism is complex and the increase in weight and size is unavoidable.

SUMMARY OF THE INVENTION

The invention aims to provide a simplified seat belt retractor that uses a belt reeling motor, without a clutch and with reduced motor noise. The invention also aims to provide a seat belt retractor with increased tension force during high-speed (e.g. more than 50 km/h) operation and emergencies, a simplified seat belt locking mechanism in emergencies, and an easy-lock mode for holding a child seat, all without increasing the size or complexity of the device.

In order to achieve these goals, an ultrasonic motor is employed as the seat belt reeling motor and one shaft is used for both seat belt reeling and motor rotation, thus driving the reel shaft without a gear or a clutch. If structured in this way, the seat belt can be smoothly drawn out when a passenger fastens the belt or moves body position forward afterwards, and the belt can be reeled with high torque in emergencies. Because the holding torque of the ultrasonic motor at rest is large, the seat belt can hold a child seat securely by merely stopping the ultrasonic motor, thus creating a locked condition that prevents the reel shaft from rotating.

BRIEF DESCRIPTION OF THE DRAWINGS

FIGS. 5A, 5B, 6A, and 6B are schematic diagrams illustrating application examples of the invention.

DETAILED DESCRIPTION OF THE PREFERRED EMBODIMENTS

Figure 1:
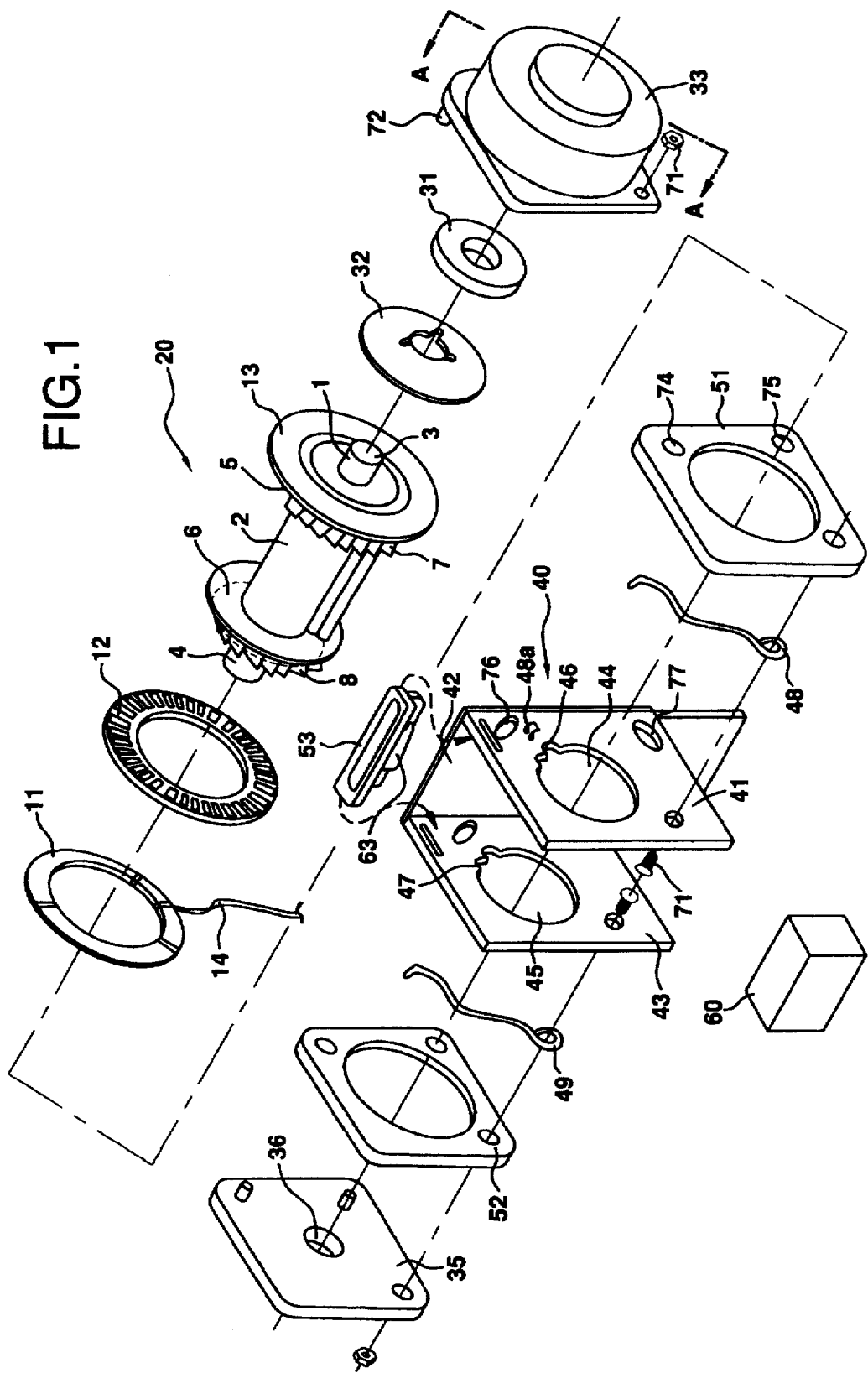
FIG. 1 is an exploded oblique projection of the invention's seat belt retractor.
Figure 2:
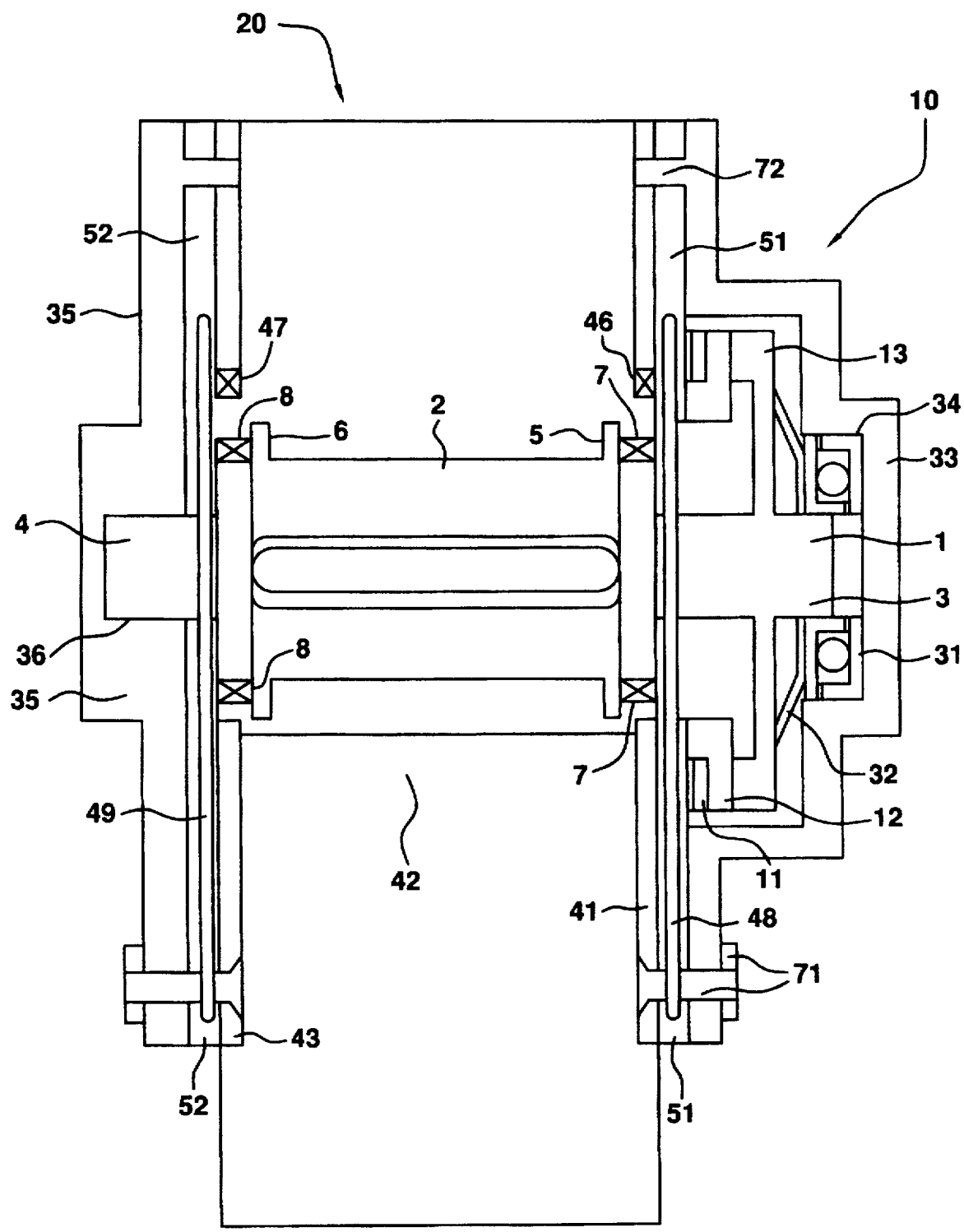
FIG. 2 is a cross section diagram of the invention's seat belt retractor along the line A—A shown in FIG. 1.

FIG. 1 is an exploded oblique projection; and FIG. 2 is a cross sectional diagram of an embodiment of the seat belt retractor. A shaft 1 of an ultrasonic motor 10 is integrated with a belt reel 2 of a seat belt retractor 20. There is no transmission mechanism, such as a gear or a clutch, between the shaft 1 and belt reel 2. The ultrasonic motor 10 includes a ring-shaped piezoelectric device array 11, a ring-shaped stator 12 in substantial contact with the piezoelectric device array 11, and a ring-shaped rotor 13, the center of which is fastened onto or integrated with the shaft 1. The shaft 1 feeds through hollow centers of the ring-shaped piezoelectric device array 11 and the ring-shaped stator 12. The rotor 13, as shown in FIG. 2, is pressed against the ring-shaped stator 12 by the force of the ring-shaped spring 32. When an ultrasonic signal is applied to the ring-shaped piezoelectric device array 11 via a lead wire 14, the ring-shaped piezoelectric device array 11 flexes in a wave like manner according to the ultrasonic signals applied, thus rotating the rotor 13 via the stator 12.

The above described ultrasonic motor is per se well known in the art as described, for example, in U.S. Pat. Nos. 4,562,374, 4,959,579 and 5,363,006 incorporated herein by reference.

One end 3 of the shaft 1 is supported for rotation by bearing 31 and the ring-shaped spring 32. The other end 4 of the shaft 1 is inserted into bearing part 36 of the cover 35. A rotation sensor 62 (FIG. 3), which detects the degree of rotation of the rotor 13, is situated on the cover 35. Guards 5 and 6 are formed on both ends of the reel 2, and the seat belt, not shown in the figures is reeled between the guards 5 and 6. Ratchet teeth 7 and 8 are formed adjacent to the guards 5 and 6 in order to lock rotation of the reel 2.

A frame 40 includes three frame portions 41, 42, and 43, wherein the frame portions 41 and 43 are parallel and connected perpendicularly to the frame portion 42. The space between the frame portions 41 and 43 is the same as the space between ratchet teeth 7 and 8. The frame portions 41 and 43 have holes 44 and 45, respectively, into which the ratchet teeth 7 and 8 are inserted, and the holes 44 and 45 have ratchet teeth 46 and 47, respectively, to correspond with the ratchet teeth 7 and 8. Springs 48 and 49 pressure both ends 3 and 4 of the shaft 1 so that the ratchet teeth 46 and 47 of the frame portions 41 and 43 do not engage with the ratchet teeth 7 and 8. The ring-shaped piezoelectric device array 11, stator 12, and cover 33 are fastened via a retainer 51 to the external wall of the frame portion 41 by using screws or similar fastening means. Similarly, the cover 35, which encloses an encoder (not shown), is fastened via a retainer 52 to the external wall of the frame portion 43 by using screws or similar fastening means.

A belt guide 53, which feeds the seat belt, and a control unit 60, which controls the motor, are mounted on the frame portion in the middle of the frame. The belt guide 53 is equipped with a tension sensor 63 that detects the tension force of the seat belt.

Figure 3:
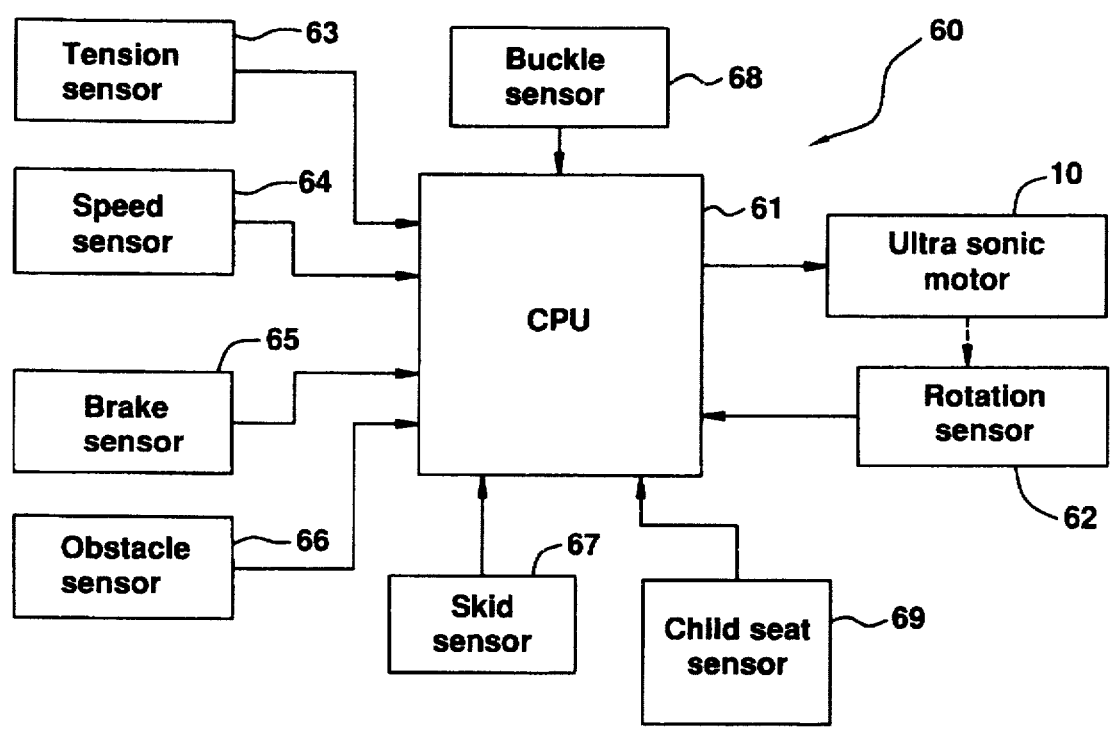
FIG. 3 is a block diagram concerning the application examples of the invention.

In reference to FIG. 3, and in accordance with a preferred embodiment of the invention, the control device 60 is equipped with a central processing unit 61 (hereinafter referred to as "CPU") that generates control signals for the ultrasonic motor 10 and various sensors 62–69. Rotation sensor 62, which mechanically or electrically detects the degree or amount of rotation of the ultrasonic motor's shaft 1, is connected to the CPU 61. Further, a tension sensor 63 that detects the tension force of the seat belt, a speed sensor 64 that detects the speed of the automobile, a brake sensor 65 that detects the pressure applied to the brake pedal, an obstacle sensor 66 that detects an impact itself or a rapidly approaching automobile or other obstacles, a skid sensor 67 that detects the skidding of the automobile, a buckle sensor 68 that detects the seat belt tongue being engaged with the buckle (not shown), and a child seat sensor 69 that detects a child seat (not shown) being placed on a car seat (not shown) are connected to the CPU 61.

Figure 4A:
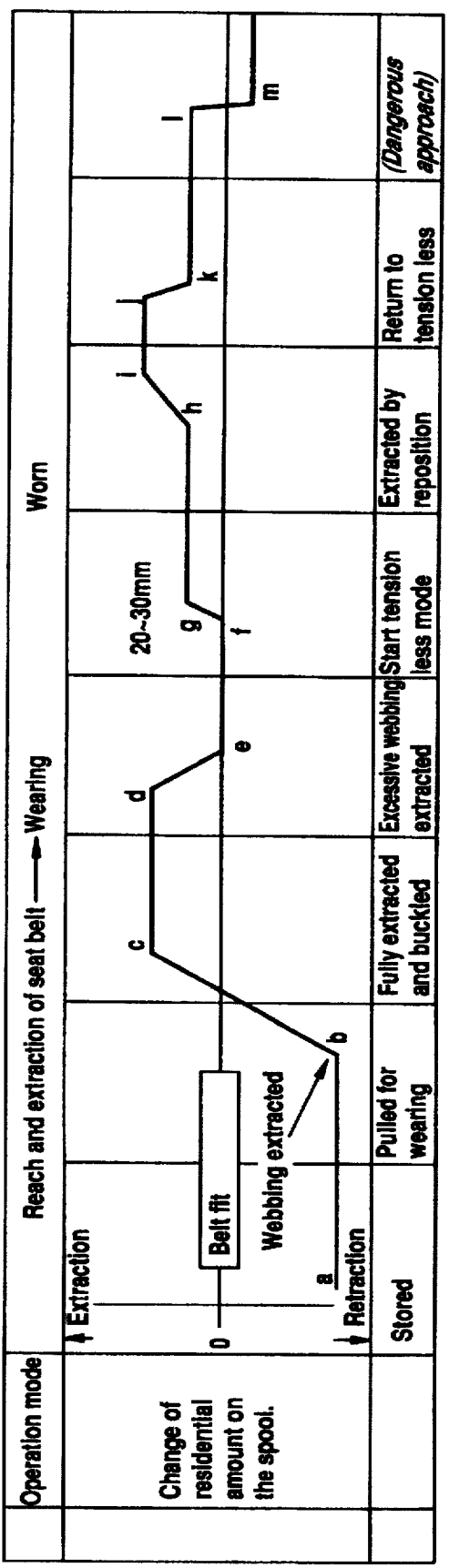
FIGS. 4A and 4B are charts explaining the operation of the invention's application example.
Figure 4B:
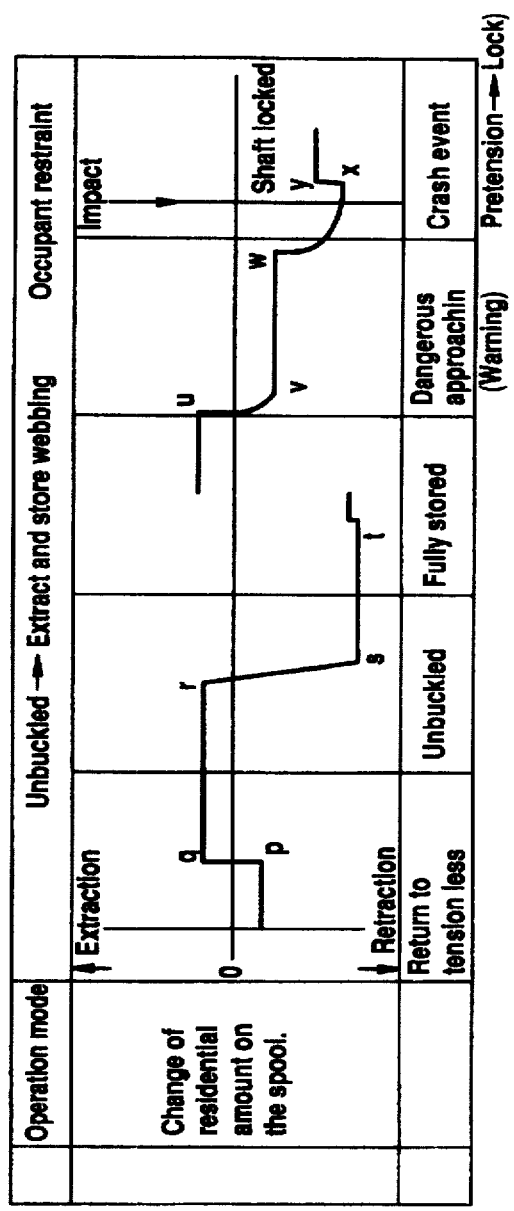

The steps in which the CPU 61 controls the ultrasonic motor according to detected signals from the sensors 62–69 are explained in reference to FIGS. 4A and 4B. The y-axes of FIGS. 4A and 4B indicate the amount of seat belt extracted or retracted, and x-axes indicate the progression of time. The "0 (zero)" indicates the position of the seat belt fitted to a passenger, and the position of the "0" is adjusted according to passenger size. The lines show the changes in length of the belt as time progresses. Letters a–x indicate positions of the belt at certain times. The line a-b indicates the seat belt not in use and fully retracted. The line b-c indicates the time from when a passenger begins to extract the seat belt to when it is buckled. When the passenger pulls the seat belt at point b, the tension sensor 63 detects it, the motor rotates in the direction of feeding out the seat belt, and the belt is drawn out. When the passenger fastens the seat belt to a buckle at point c, the buckle sensor 68, which is situated on the buckle to detect the use of the seat belt, detects it and sends a signal to the CPU 61. The CPU 61 upon receipt of the buckle signal stops the ultrasonic motor 10. During the process, the tension sensor 63 continuously detects the tension force of the seat belt and sends signals to the CPU 61. If the tension sensor 63 stops detecting the tension force before the buckle sensor detects the use of the seat belt, the CPU 61 determines that the passenger does not wish to wear the seat belt and sends the ultrasonic motor 10 a signal to reel in the belt.

Figure 5B:
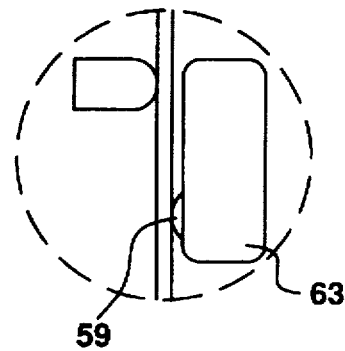
Figure 5A:
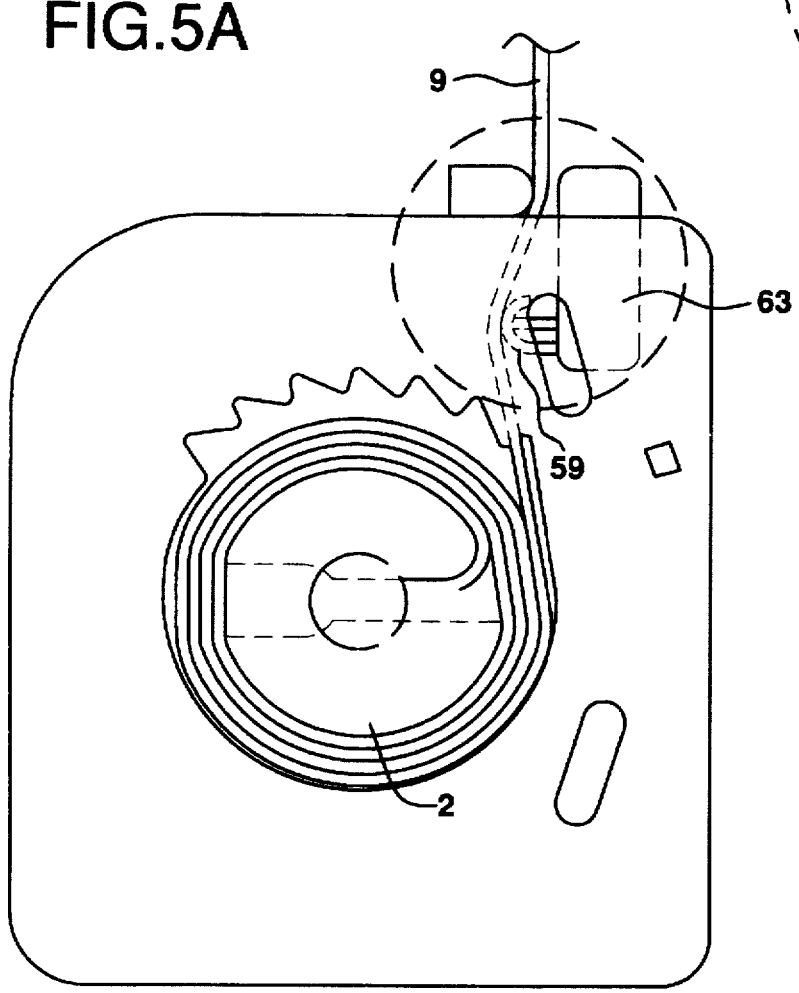

FIGS. 5A and 5B show the working condition of the tension sensor 63. FIG. 5A indicates the state in which no or little tension is applied to the belt 9 reeled on the reel 2, and so a sensor lever 59 is not depressed. The tension sensor 63 sends the CPU 61 a signal indicating that little or no tension is being applied. When more than a threshold tension is applied to the belt 9, the sensor lever 59 is depressed, as shown in FIG. 5B, and the tension sensor 63 sends the CPU 61 a signal indicating that the threshold tension or greater is being applied.

Returning to FIG. 4A and 4B, once the CPU 61 detects the loss of tension and the buckled condition (via buckle sensor 8) at point c, and after a certain period of time at point d, it controls the ultrasonic motor 10 to slowly reel-in the belt and reduce the slack. When the slack is gone and the tension sensor 63 detects a stable tension force, the CPU 61 stops the ultrasonic motor 10 and stores the initial value, such as "0" or reference value in CPU internal memory, e.g. RAM. Thereafter, the CPU 61 produces numerical values for belt positions by using data from the rotation sensor 62. By comparing the several rotation data with the reference values the CPU 61 determines the position of the belt according to the degree it is extracted or retracted from the reference position.

At point e the belt is fitted to the passenger and can be left alone, but it may be more comfortable if the belt is slightly looser. Thus, at point f the ultrasonic motor is prompted to extract the belt until it reaches the level at point g; the ultrasonic motor is stopped when a certain amount of belt (approximately 20–30 mm) is extracted at point g. The belt feed position at point g is also stored in the internal memory of the CPU 61.

If the passenger tries to bend his/her upper body forward at point h, the tension sensor 63 detects the pull on the seat belt, and the CPU 61 controls the ultrasonic motor 10 to feed-out the seat belt. After the belt is fed-out to the level at point i, and if the passenger's upper body is returned to the initial position, the belt tension is removed. The tension sensor 63 detects this condition, and the CPU 61 stops the ultrasonic motor 10. The ultrasonic motor 10 is prompted again at point j until the belt is retracted to the aforementioned position g (approximately 20–30 mm), upon which the motor is stopped at point k. It goes without saying that during this period the rotation sensor 62 always remains operating and sends belt position signals to the CPU 61.

At point 1, if the speed sensor 64 detects that the automobile is now being operated at high speed, or if the brake sensor 65 detects a sudden depression on the brake, or if the obstacle sensor detects any obstacle in front of the vehicle, or if the skid sensor 67 detects that the automobile is skidding, or if any other dangerous or potentially dangerous situation is detected, the CPU 61 retracts the belt to the position shown at point m in order to prepare for a possible crash or sudden deceleration assuming if the detector no longer signals a dangerous condition, at point p and the automobile returns to normal driving conditions, the CPU 61 again prompts the ultrasonic motor 10 to draw out the belt until it returns to the aforementioned position g (e.g. 20–30 mm), after which the motor is stopped at point q.

When the automobile comes to a stop and the belt is unbuckled at point r, the buckle sensor 68 detects this condition and the CPU 61 prompts the ultrasonic motor 10 to reel-in the belt until it reaches the point s. The belt stops when it is reeled-in to the position s, and after the tension sensor 63 detects the increase in tension, the CPU 61 terminates ultrasonic motor operation at point t.

While the automobile is operated under normal driving conditions and while the belt is slightly loose as in position g, and when, at point u, the obstacle sensor 66 and for the skid sensor 67 detect approaching danger, the CPU 61 reels-in the belt to the position v in order to prepare for a sudden deceleration or loss of control. In the event the obstacle sensor 66 and/or skid sensor 67 detections are triggered and the CPU 61 determines an impact is unavoidable, at point w, the CPU 61 quickly reels-in the belt in preparation for an impact. In this case, the ultrasonic motor 10 can, due to its characteristics, quickly and with high torque retract the belt. The tension switch is ignored when any dangerous condition is sensed, e.g. high vehicle obstacle detection etc. In the event of a crash, at point x, the tension force rapidly increases as the passenger's weight is applied to the belt, the belt reel 2 moves against the springs 48 and 49, and at point y ratchet teeth 7 and 8 of the guards 5 and 6 engage with ratchet teeth 46 and 47 of the frame portions, thus locking the shaft 1. Under this condition the belt is sufficiently retracted from the "0" position so as to be able to secure the passenger.

FIGS. 6A and 6B are side views of the seat belt retractor, viewed from the position of the retainer 51 in a direction toward the frame portion 41. The retainer 51 is shown as if it is transparent for illustrative purpose. FIG. 6A shows the case of little or no tension applied to the belt 9, and FIG. 6B shows a large tension force on the belt 9. The retainer 51, together with one end of the spring 48, is attached by the fastening member 71 in such a way as to freely rotate. The other end of spring 48 abuts stop 48a so that the spring 48 forces one end 3 of the belt reel 2 in the opposite direction of the belt drawing direction F. The cover 33 (FIGS. 1 and 2) has two protrusions 72 and 73 (not shown in FIGS. 1 and 2) which are inserted into holes 74 and 75 established on the retainer 51 and elliptic holes 76 and 77 established on the frame portion 41. The reel 2 can, with the fastening member 71 as a pivot, rotate between protrusions 72 and 73.

Under the condition as shown in FIG. 6A, the belt 9 is drawn out in the direction of arrow F, but because the tension force is weak the belt reel spring 48 overcomes the tension force, the reel 2 does not rotate about the fastening member 71 nor do the ratchet teeth 7 of the reel 2 and ratchet teeth 46 of the frame portion 41 engage with each other. On the contrary, if more than a certain level of tension force is applied to the belt 9, the reel 2 rotates in the direction of arrow T about the fastening member 71 as a pivotal center and ratchet teeth 7 of the reel 2 and ratchet teeth 36 of the frame portion 41 engage, thus locking the reel 2. As explained above, such a locking of reel 2 occurs at point y in FIG. 4B.

The above described locking structure of FIGS. 6A and 6B is per se well known in the art as described, for example, in U.S. Pat. No. 4,506,844 incorporated herein by reference.

To fasten a child seat (not shown), a child seat is set on a car seat (not shown). The child seat sensor 69 senses that the child seat is set on the car seat and supplies the signal thereof and the CPU 61 recognizes the same. The sensor can be either a manually operable switch or an ultrasonic or infrared sensor.

The ultrasonic or infrared sensor is per se well known in the art as described, for example, in U.S. Pat. No. 5,454,591 incorporated herein by reference. When a person who sets the child seat pulls the seat belt, the tension sensor 63 detects it, the motor rotates in the direction of feeding out the seat belt, and the belt is drawn out. When the person stops pulling the belt, the tension sensor 63 detects it and sends the signal to the CPU 61. The CPU 61 upon receipt of the tension sensor signal stops the ultrasonic motor 10. The person further fastens the seat belt to the buckle, the buckle sensor 68 detects it and sends a signal to the CPU 61. When the tension sensor 63 stops detecting the tension force and the buckle sensor 68 detects the belt being fastened, the CPU 61 controls the ultrasonic motor 10 to slowly reel-in the belt and reduce the slack. When the child seat sensor 69 senses that the child seat is set, the buckle sensor 68 detects the belt being fastened and the tension sensor 63 detects the tension force, the CPU 61 directs the ultrasonic motor 10 to further retract the belt and stops the motor 10 when a certain amount of belt (approximately 20–30 mm) is extracted.

Because an ultrasonic motor has the characteristics that it has high holding torque when electricity is not supplied and it is maintained stationary, the ultrasonic motor 11 holds the child seat without electricity being supplied by the CPU 61.

As explained above, the seat belt retractor in accordance with the principles of the invention incorporates an ultrasonic motor instead of a conventional DC motor; this design enables miniaturization of the mechanism while providing numerous functions, such as adjustment of slack, drawing out the seat belt according to passenger posture, reeling-in the belt in case of emergencies, and high-speed reeling immediately before a crash. Especially noteworthy, when the belt is retracted at high speeds immediately before a crash, it retracts the belt with a high tension torque unattainable by a DC motor. Weight and noise are also reduced because the ultrasonic motor 10 does not need a gear, which was necessary between DC motors and belt reels. The use of an ultrasonic motor as a seat belt reeling motor, and a common shaft for belt reeling and motor rotation, enables the reel shaft to be driven without gears and clutches. The motor feeds the seat belt smoothly when passengers fasten the belt or change posture while wearing the belt, and retracts it with a powerful torque during emergencies. Also, if structured so that the seat belt is drawn out while worn and reeled-in while not worn by rotating the ultrasonic motor, it is not necessary to provide a spring mechanism for giving torque to reel-in the seat belt. Therefore, the use of the ultrasonic motor allows for omission of the spring mechanism that forces the reel towards the reeling direction.

When the ultrasonic motor is at rest the seat belt is in a holding or locked state, e.g. the motor's holding power is used to effect locking, for example, useful with a child seat. Therefore, the invention eliminates the need for a special gear mechanism, which was required for conventional retractors when securing child seats.

The invention is not intended to be limited by the specific embodiments described herein as various modifications and improvements will be evident to those of skill in the art.

What is claimed is:

1. A seat belt retractor comprising:
   a) a reel having a shaft for reeling and unreeling a seat belt;
   b) an ultrasonic motor for rotating the shaft, the ultrasonic motor comprising:
      1) a plurality of piezo-electric devices, said piezo-electric devices receiving a control signal for actuating said ultrasonic motor,
      2) a stator secured to said piezo-electric devices and
      3) a rotor placed adjacent said stator;
   c) said rotor integral with or rigidly attached to said shaft for rotating said shaft upon actuation of said motor, said shaft rotating in a first direction to retract said seat belt and rotating in a second, opposite direction to extract said seat belt; and
   d) a control device for controlling the rotation of the ultrasonic motor by supplying said control signal to said ultrasonic motor.

2. A seat belt retractor as set forth in claim 1, further comprising:
   at least one sensing device for supplying sense signals, and wherein said control device comprises a central processing unit receiving said sense signals and, in response thereto, generating said control signal.

3. A seat belt retractor as set forth in claim 2, wherein said at least one sensing device comprises a rotation sensor for sensing the amount of rotation of said shaft.

4. A seat belt retractor as set forth in claim 3, wherein the central processing unit sets an initial value of seat belt extraction based on the sensed amount of rotation corresponding to the amount of belt extracted when a person is seated and belted in a seat of a vehicle.

5. A seat belt retractor as set forth in claim 2, wherein said at least one sensing device comprises a tension sensor for sensing tension of the seat belt and for supplying a sensed signal of the tension to the central processing unit.

6. A seat belt retractor as set forth in claim 5, the central processing unit prompts the ultrasonic motor to retract the seat belt when the value of the sensed signal corresponds to no tension force on the seat belt and to draw out the seat belt when the value of the sensed signal corresponds to an increased tension force of the seat belt.

7. A seat belt retractor as set forth in claim 2, wherein said at least one sensing device comprises a sensor for sensing a predetermined dangerous condition and for supplying a sensed signal, and wherein said central processing unit provides said control signal, in response to said sensed signal, to cause the motor to retract said seat belt.

8. A seat belt retractor as set forth in claim 7, wherein said at least one sensor comprises a speed sensor.

9. A seat belt retractor as set forth in claim 7, wherein said at least one sensor comprises a brake sensor.

10. A seat belt retractor as set forth in claim 7, wherein said at least one sensor comprises an obstacle sensor.

11. A seat belt retractor as set forth in claim 7, wherein said at least one sensor comprises a skid sensor.

12. A seat belt retractor as set forth in claim 1, wherein said control device stops the ultrasonic motor when the seat belt holds a child seat.

13. A seat belt retractor as set forth in claim 1,
   wherein the retractor further comprises a first ratchet mechanism at an end of the shaft and
   a frame portion having a circular hole whereto the shaft and the first ratchet mechanism are inserted, a periphery of said hole including a second ratchet mechanism, wherein the first and second ratchet mechanisms matingly engage one another to lock said shaft from rotation.

14. A seat belt retractor as set forth in claim 13,
   wherein the frame comprises a pair of frame portions, and wherein the retractor further comprises a pair of retainers each having a center recess for receiving an end of the shaft, each of the frame portions fixedly secured for translational movement with said shaft and further having a pivot mechanism loosely fitted to the frame so as to have the retainers rotate about the pivot mechanism and to have the first and second teeth engage or disengage.

15. A seat belt retractor as set forth in claim 1, wherein said piezo-electric device and said stator are ring-shaped and are positioned proximate said reel.

16. A seat belt retractor as set forth in claim 15 wherein said rotor and shaft are directly coupled to one another without any intermediate gearing mechanism.

17. A method of reeling and unreeling a seat belt from a reel of a retractor attached to a vehicle comprising the steps of:
   a) positioning an ultrasonic motor adjacent said shaft of said reel,
   b) sensing at least one condition of at least one of said vehicle and said belt,
   c) actuating said ultrasonic motor for one of reeling and unreeling in response to said sensed condition.

18. A seat belt retractor comprising:
   a seat belt reel having a shaft;
   an ultrasonic motor including a ring-shaped piezoelectric device array, a ring-shaped stator in substantial contact with the piezoelectric device array, and a ring-shaped rotor rotatable with both the stator and the shaft, the piezoelectric device array flexing in a wavelike manner according to ultrasonic control signals supplied thereto, the stator being rotated in response to the flexing of the piezoelectric device array to cause the rotor and the shaft to rotate therewith; and
   a control device for supplying the ultrasonic control signals to the ultrasonic motor.

19. A seat belt retractor as set forth in claim 18, further comprising a ring-shaped spring which presses the rotor against the stator.

20. A seat belt retractor as set forth in claim 19, wherein the shaft extends through centers of the piezoelectric device array and the stator and the rotor has a center portion which is connected to the shaft for rotation therewith.

* * * * *